US008660976B2

(12) United States Patent
Vasquez Lopez et al.

(10) Patent No.: US 8,660,976 B2
(45) Date of Patent: Feb. 25, 2014

(54) WEB CONTENT REWRITING, INCLUDING RESPONSES

(75) Inventors: Daniel Vasquez Lopez, Duvall, WA (US); Ruslan A. Yakushev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/690,120

(22) Filed: Jan. 20, 2010

(65) Prior Publication Data

US 2011/0178973 A1 Jul. 21, 2011

(51) Int. Cl.
*G06N 5/02* (2006.01)

(52) U.S. Cl.
USPC .......................................................... 706/48

(58) Field of Classification Search
None
See application file for complete search history.

(56) References Cited

U.S. PATENT DOCUMENTS

| | | | |
|---|---|---|---|
| 6,886,014 B1 | 4/2005 | Dasgupta | |
| 7,058,633 B1 | 6/2006 | Gnagy et al. | |
| 7,308,643 B1* | 12/2007 | Zhu et al. | 715/206 |
| 7,546,526 B2 | 6/2009 | Spada | |
| 7,827,254 B1* | 11/2010 | Nevill-Manning et al. | 709/218 |
| 2006/0020684 A1* | 1/2006 | Mukherjee et al. | 709/219 |
| 2007/0055930 A1* | 3/2007 | Jerrard-Dunne et al. | 715/523 |
| 2008/0183902 A1* | 7/2008 | Cooper et al. | 709/250 |
| 2009/0164502 A1* | 6/2009 | Dasgupta et al. | 707/102 |
| 2009/0193126 A1* | 7/2009 | Agarwal et al. | 709/228 |
| 2009/0234972 A1* | 9/2009 | Raghu et al. | 709/246 |
| 2010/0011107 A1* | 1/2010 | Leighton et al. | 709/226 |

OTHER PUBLICATIONS

Kang, Juyoung and Lee, Jae Kyu, "Rule Identification from Web pages by the XRML approach", Decision Support Systems, vol. 41 (2005) pp. 205-227.*
Kang and Lee, "Rule Identification from Web Pages by the XRML approach", Decision Support Systems, vol. 41, 2005, pp. 205-227.*
"Ionic's ISAPI Rewriting Filter 2", Retrieved at <<http://wareseeker.com/Network-Internet/ionic-s-isapi-rewriting-filter-2.zip/3b75dbdab7>>, Jul. 16, 2008, pp. 3.
"Defining Rewriter Rules and Rulesets", Retrieved at <<http://docs.sun.com/source/817-7696/rw-ch3.html>>, Mar. 2005, pp. 8.
"Modifying URLs in Responses", Retrieved at http://publib.boulder.ibm.com/infocenter/tivihelp/v2r1/index.jsp?topic=/com.ibm.itame.doc_6.0/rev/am60_webseal_admin178.htm>>, Nov. 2006, p. 1.
"HTML::TagFilter Documentation", Retrieved at <<http://spark.spanner.org/tagfilter/docs/>>, 2001, p. 1.

(Continued)

*Primary Examiner* — Kakali Chaki
*Assistant Examiner* — Walter Hanchak

(57) ABSTRACT

A content rewriting system is described herein that allows web site administrators to setup rewriting of web responses in an easy and efficient manner. The system provides a configuration schema and an efficient workflow that enables web administrators to easily setup rules to modify HTML or other content without having a high performance penalty or losing flexibility. The content rewriting system applies regular expressions or wildcard patterns to a response to locate and replace the content parts based on the rewriting logic expressed by outbound rewrite rules. The system parses an initial response generated by a web application, applies one or more outbound rules to rewrite the response, and provides the rewritten response to a client that submitted a request for the response.

12 Claims, 4 Drawing Sheets

(56) References Cited

OTHER PUBLICATIONS

Ricca, et al., "Restructuring Web Applications via Transformation Rules", Retrieved at <<http://ieeexplore.ieee.org/stamp/stamp.jsp?tp=&arnumber=972676&isnumber=20963>>, Proceedings. First IEEE International Workshop on, 2001, pp. 150-160.

"Mod_Proxy_Html", Retrieved at http://apache.webthing.com/mod_proxy_html/>>, Sep. 18, 2009, pp. 3.

Yakushev, Ruslan, "Using URL Rewrite Module 2.0", Retrieved at <<http://learn.iis.net/page.aspx/664/using-url-rewrite-module-20>>, Jul. 16, 2009, pp. 5.

* cited by examiner

WEB CONTENT REWRITING, INCLUDING RESPONSES

BACKGROUND

Web sites are generally composed of Hypertext Markup Language (HTML) content. Individual web pages may contain links to other web pages, files, multimedia, and so forth. A web site may be associated with a particular Domain Name System (DNS) name, such as "www.microsoft.com" that resolves to one or more Internet Protocol (IP) addresses that identify one or more servers hosting the web site. Web pages within a website are typically identified by paths added to the DNS name, such as "www.microsoft.com/office/" where "office" specifies a virtual directory that contains a web page, or query strings, such as "www.website.com/pages?content=123" where the server interprets "content=123" to identify a particular web page stored at or generated by the server. Many content management systems (CMS) automatically generate pages and links within pages based on a content structure defined at the server.

At times, it is useful to move content from its original location or to provide users with a friendlier or more memorable path to access content than one provided automatically by a CMS. In some cases, an administrator may prefer a path that provides search engine optimization (SEO) advantages by containing particular keywords in the uniform resource locator (URL) path. Existing URL rewriting components of web servers allow a server administrator to specify rules for mapping incoming URLs provided by clients accessing a website to internal URLs that the web server recognizes. For example, a URL rewriting rule may allow users to specify a path "www.website.com/games" to access game-related content, rather than a less user friendly URL where the server provides the content like "www.website.com/?content_id=1234&layout=column."

Unfortunately, existing rewriting components of web servers focus on requests and often do not handle or poorly handle links in responses. A web page provided by a web server in response to a request may contain links to other pages or content using URLs that are not modified in the same way request URLs are modified. Administrators may become confused trying to maintain two different URL schemes (e.g., an original and a user-friendly one) and may make mistakes so that links to content do not work as expected. In addition, SEO advantages may not be realized when links in responses are not transformed in the same way as request URLs. Users and software (such as search engines) also may miss relationships between content that does not share a common path. For example, while it may be clear that "/news" and "/news/sports" are related, it is less apparent that the same relationship may exist on a particular web server for a link to the same content that is not properly rewritten, such as "/pages?article_id=abcd." Although some solutions attempt rewriting of content responses, they do so in a string-based manner, crudely searching the entire response for matching text strings without context. This can lead to errors in web pages and replacement of text that should not be replaced (e.g., quoted text that is not part of a link) as well as other problems.

SUMMARY

A content rewriting system is described herein that allows web site administrators to setup rewriting of web responses in an easy and efficient manner. The system provides a configuration schema and an efficient workflow that enables web administrators to easily setup rules to modify HTML or other content without having a high performance penalty or losing flexibility. The content rewriting system applies regular expressions or wildcard patterns to a response to locate and replace the content parts based on the rewriting logic expressed by outbound rewrite rules. The main configuration concept used for response rewriting is the concept of an outbound rule. An outbound rule expresses the logic of what to compare or match the response content with and what to do if the comparison is successful. The system parses an initial response generated by a web application, applies one or more outbound rules to rewrite the response, and provides the rewritten response to a client that submitted a request for the response. Thus, the content rewriting system improves web content where rewriting is used to map content from a stored URL scheme to a different scheme.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
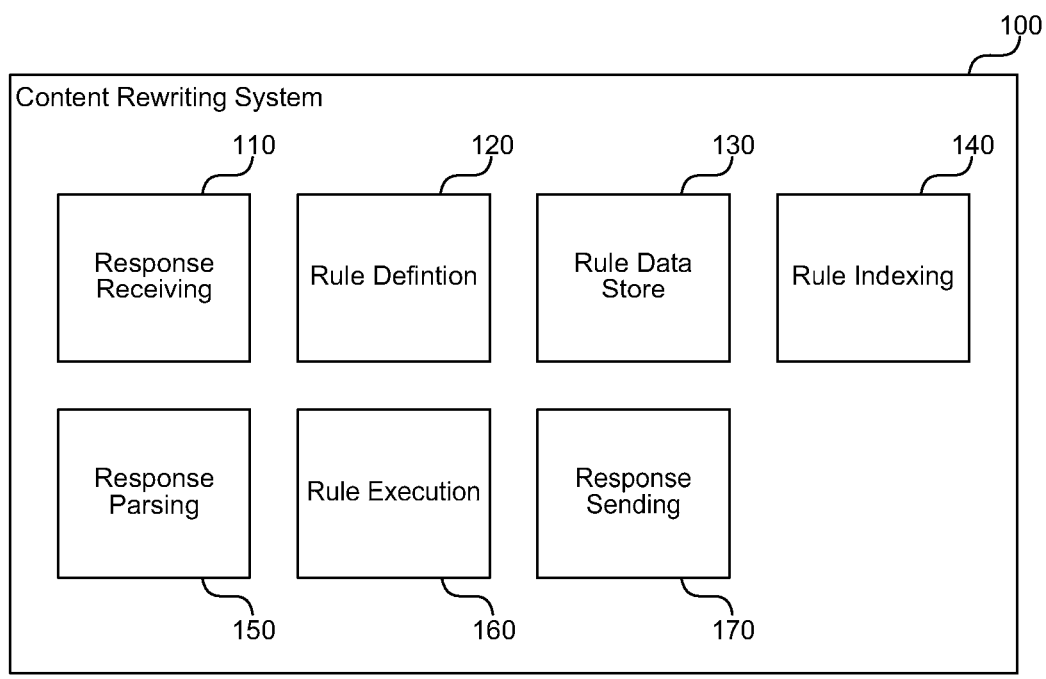
FIG. 1 is a block diagram that illustrates components of the content rewriting system, in one embodiment.

A content rewriting system is described herein that allows web site administrators to setup rewriting of web responses in an easy and efficient manner. The system provides a configuration schema and an efficient workflow that enables web administrators to easily setup rules to modify HTML or other content without having a high performance penalty or losing flexibility. In some embodiments, the system provides a fast parser that recognizes HTML tags (both well-known tags and custom tags) so that administrators can apply each defined rule to a specified tag. The content rewriting system applies regular expressions or wildcard patterns to a response to locate and replace the content parts based on the rewriting logic expressed by outbound rewrite rules. The system can be used, for example, to replace URLs generated by a web application in a content response with a more user friendly and search engine friendly equivalent, modify links in the content response behind a reverse proxy, modify existing and set new response headers, and fix up the content of any HTTP response (including JavaScript, CSS, RSS, and so forth).

The main configuration concept used for response rewriting is the concept of an outbound rule. An outbound rule expresses the logic of what to compare or match the response content with and what to do if the comparison is successful. The system parses an initial response generated by a web application, applies one or more outbound rules to rewrite the response, and provides the rewritten response to a client that submitted a request for the response. Thus, the content rewriting system improves web content where rewriting is used to map content from a stored URL scheme to a different scheme.

In some embodiments, the content rewriting system receives configuration data through an extensible markup language (XML) file. The system provides a comprehensive XML configuration that allows expressing multiple rules for rewriting of HTML output in an efficient way. Administrators can define tag-based rules that include a tag filter to apply to a specific tag or free-matching rules that perform string-based matching. Tag-based rules accept predefined and well-known HTML Tags like "a" (anchor), "img" (image), "form," and so forth as well as custom tags. The administrator can define custom tags in a collection of pairs where the first element is a name of the tag (e.g., "font") and the second element is an attribute of the tag (e.g., "size"). This type of rule matches the HTML tag's attribute(s) instead of the entire HTML response. For example, given "<a href="https://contoso.com/page.aspx?id=1">Here</a>" and a rule with a filter that contains tag "a," and attribute "href," the system will filter the rule's input to the content of the href attribute, so that "https://contoso.com/page.aspx?id=1" will be the input for the rule's matching pattern. If the rule matches the input text, then the system will rewrite the URL as specified by the rule.

A free-matching rule is a rule without any HTML tag filter and may include a regular expression or verbatim string to match the entire HTML response. Administrators can define rules with and without tag filters in lists of contiguous rules.

Conceptually, an outbound rule includes the following parts: a precondition, tag filters, a pattern, conditions, and an action. A rule specifies the optional precondition to check request metadata before any rules evaluation begins. Preconditions may include several conditional checks against request metadata and can be used to filter out responses that need not be rewritten (e.g., non-HTML responses such as images or video files). A rule specifies tag filters to narrow down a search within the response to a set of well-known or custom defined tags. With tag filters, only the content of specified tags is matched against the rule pattern, as opposed to matching the entire response content against the pattern. The rule pattern specifies either a regular expression or a wildcard pattern for searching within the response content. The optional conditions collection specifies additional logical operations to perform if a pattern match is found within the response content. Within the conditions, a rule can check for certain values of HTTP headers or server variables. The action specifies what to do if the pattern match is found and all the rule conditions are evaluated successfully.

FIG. 1 is a block diagram that illustrates components of the content rewriting system, in one embodiment. The system 100 includes a response receiving component 110, a rule definition component 120, a rule data store 130, a rule indexing component 140, a response parsing component 150, a rule execution component 160, and a response sending component 170. Each of these components is described in further detail herein.

The response receiving component 110 receives an initial response to a content request. For example, a web application may provide the initial response after receiving an HTTP request from a client. The web application may provide the response to the response receiving component 110 as part of a request handling workflow provided by a web server. The response receiving component 110 may also receive information associated with the response, such as the request, request headers, response headers, server variables, and so forth. The components of the content rewriting system 100 can use this information in rewriting rules to modify the initial response.

The rule definition component 120 allows an administrator to define one or more rules for rewriting the received initial response. The rule definition component 120 may include various user interfaces for defining rules, such as a graphical user interface (GUI), console user interface (CUI), programmatic application programming interface (API), and so forth. The interfaces provide actions for defining, deleting, editing, and reordering rules. The rule definition component 120 receives information that defines a rule, such as preconditions, tag filters, match patterns, conditions, and a rewriting action. The rule definition component 120 stores defined rules in the rule data store 130.

The rule data store 130 stores defined rules for access in response to received requests. The rule data store 130 may include various storage devices, such as an XML or other file, a database, a storage area network (SAN), a cloud-based storage service, and so forth. The rule data store 130 receives rules and modifications to rules from the rule definition component 120 and provides rules in response to requests from other components, such as the response parsing component 150.

The rule indexing component 140 reads defined rules from the rule data store 130 and determines a union of matching filters defined within the rules. For example, the rule indexing component 140 may determine that among 30 rules, the rules all apply to either the "a" or "img" HTML tags. The component 140 uses this information to provide a hint to the response parsing component 150 about tags or other content in a parsed response that are potentially applicable to the defined rules.

The response parsing component 150 parses the received initial response and invokes the rule execution component 160 for one or more portions of the initial response that match one or more matching filters of the defined rules to produce a rewritten response. For example, when the response parsing component 150 encounters a tag within the response, the component 150 may retrieve data from the rule indexing component 140 to determine if the tag matches one or more rules. If so, the response parsing component passes the matching tag and rules to the rule execution component for further processing. The response parsing component 150 may perform multiple parsing passes, such as a first pass to apply tag-based rules and a second pass to apply free-matching rules. In addition, the component 150 may store the output response of one rule to supply as input to the next rule in a chain of rules. The response parsing component 150 may also check rule preconditions before any rule evaluation begins to determine whether a particular response is not a candidate for rewriting (e.g., potentially images or video files).

The rule execution component 160 executes one or more rules on a portion of a response provided by the response parsing component 150. The rule execution component 160 evaluates a rule pattern against text of the response portion associated with a specified tag (or all text for free-matching rules). The rule may also include conditions, such as values of HTTP headers that the component 160 also evaluates to determine whether the rule applies. If the rule applies, then the rule execution component 160 performs an action specified by the rule, such as replacing one pattern with another, appending text to a URL, and so forth. Those of ordinary skill in the art will recognize numerous rewriting actions that the component 160 can take in addition to the examples provided herein.

The response sending component 170 passes the rewritten response back to a sender from which the initial response was received. The sender may include a web server that invokes one or more extension modules (of which a rewriting module implementing the system 100 described herein is but one)

prior to providing a response to a client of the web server. Ultimately, the web server provides the rewritten response (along with any further modifications performed by other extensions) to the client in response to a client request. The client may subsequently send additional requests based on rewritten links or other content within the rewritten response.

The computing device on which the content rewriting system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In some embodiments, the content rewriting system is implemented as an extension module to an existing web server. For example, Microsoft Internet Information Server (IIS) and other web servers often allow developers to extend the functionality of the web server by registering modules that include logic for performing particular actions. The web server invokes the module at points within the processing of web requests and responses so that the module can modify the behavior of the web server. As an example, Microsoft IIS 7 includes a process w3wp.exe that performs web server functions and loads extension modules designed to work with the web server. The content rewriting system adds a module rewrite.dll that performs the rewriting processing described herein. When the web server receives an HTML request, the process w3wp.exe preprocesses the request and passes it along to any web applications or modules (such as rewrite.dll) that are registered to produce a response. The rewriting module modifies the response and provides the response to w3wp.exe to send back to the original requestor.

Figure 2:
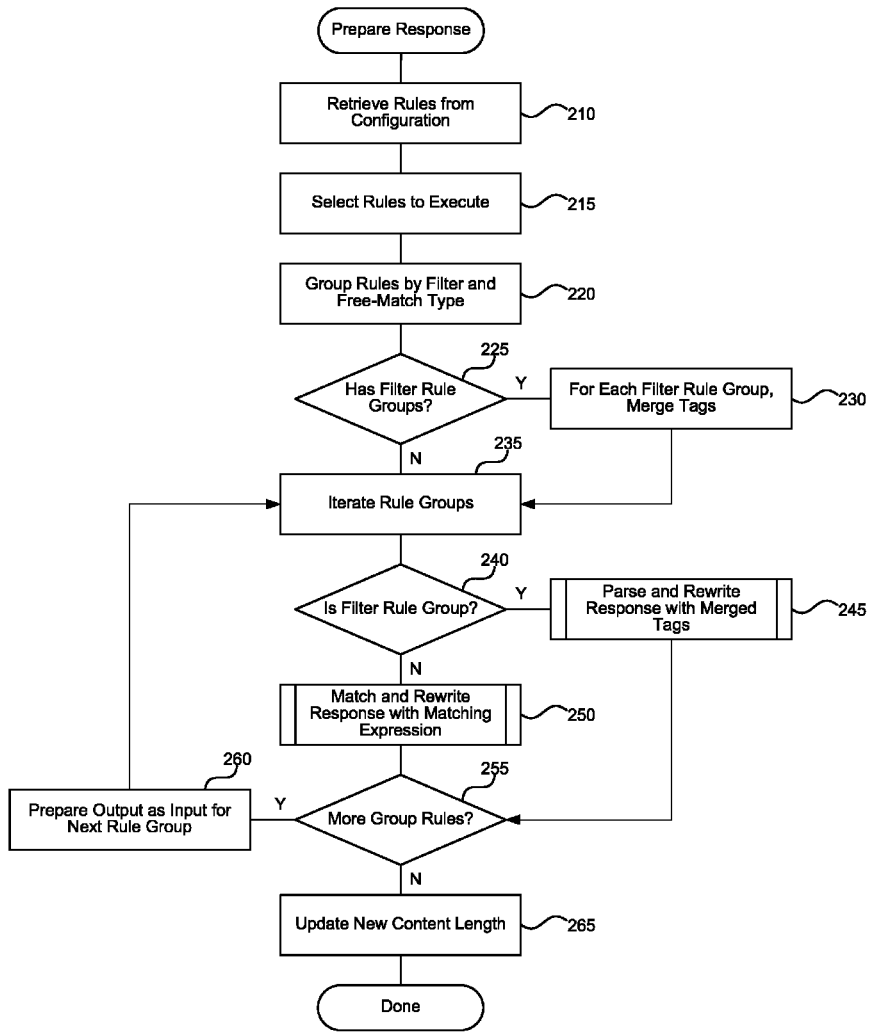
FIG. 2 is a flow diagram that illustrates processing of the system to prepare a response by applying one or more rules, in one embodiment.

FIG. 2 is a flow diagram that illustrates processing of the system to prepare a response by applying one or more rules, in one embodiment. Beginning in block 210, the system retrieves rules from the rule store. For example, the system may access an XML file or other data store from a web server associated with the system and load the rules stored in the data store. Continuing in block 215, the system selects rules to execute. The system may select rules based on preconditions or other criteria. For example, a precondition may indicate that a particular rule runs only when a particular server variable or request header is set. In addition, an administrator may disable some rules so that they temporarily do not run. Continuing in block 220, the system groups rules by filter and free-match type. For example, the system may group tag-based rules that apply to the same tag, so that the system can apply those rules when parsing in one pass. The system may also group free-match rules and apply those rules in a second pass after applying any applicable tag-based rules.

Continuing in decision block 225, if the system finds one or more tag-based rules, then the system continues at block 230, else the system continues at block 235. Continuing in block 230, the system merges the tags for each filter rule group. For example, the system may determine the union of all of the tags specified by the rules, so that the parser knows tags for which to invoke rules. Continuing in block 235, the system begins iterating the rule groups by selecting the first rule group. On subsequent iterations, the system selects the next rule group or free match filter if all tag-based rules have been processed. Continuing in decision block 240, if the currently selected rule group is a tag-based rule group, then the system continues at block 245, else the system continues at block 250. If processing continues to block 245, the system parses and rewrites the response based on the merged tags from block 230. This process is described further with reference to FIG. 3. After block 245, the system continues at block 255.

Alternatively, if processing continues to block 250, the system matches and rewrites the response based on matching expressions in free-match rules. This process is described further with reference to FIG. 4. Continuing in decision block 255, if there are more rule groups, then the system continues at block 260, else the system continues at block 265. If processing continues to block 260, the system prepares the output of the current rule group as the input for the next rule group and loops to block 235 to select the next rule group. Alternatively, if processing continues to block 265, the system updates the content length of the response based on the rewriting performed by the rules, and completes. After block 265, these steps conclude.

Figure 3:
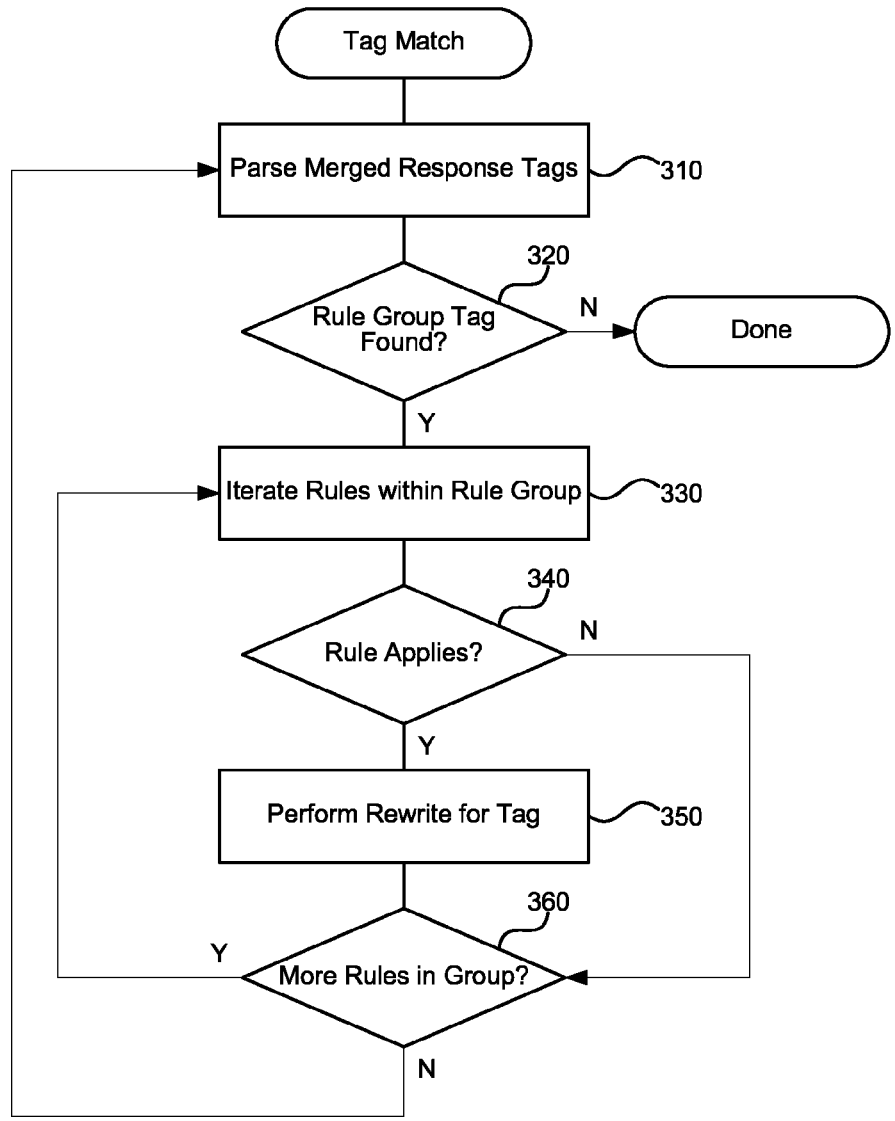
FIG. 3 is a flow diagram that illustrates the processing of the rule execution component with respect to a tag-based rule, in one embodiment.

FIG. 3 is a flow diagram that illustrates the processing of the rule execution component with respect to a tag-based rule, in one embodiment. Beginning in block 310, the component parses the response to identify tags associated with a current tag-based rule group. For example, a particular group of rules may apply to the HTML anchor tag ("a"), and the system parses the response to identify anchor tags. Continuing in decision block 320, if the tag associated with the rule group is found, then the component continues at block 330, else the component completes.

Continuing in block 330, the component iterates rules within the rule group by selecting the first rule in the group. On subsequent iterations, the component selects the next rule in the group. Continuing in decision block 340, if the rule applies to the found tag, then the component continues at block 350, else the component jumps to block 360. Continuing in block 360, the component performs a rewrite of the found tag based on an action specified by the selected rule. For example, the action may specify existing text to replace with new text or text to append to existing text. Continuing in decision block 360, if there are more rules in the rule group, then the component loops to block 330 to select the next rule in the group, else the component loops to block 310 to continue parsing the response. After block 360, these steps conclude.

Figure 4:
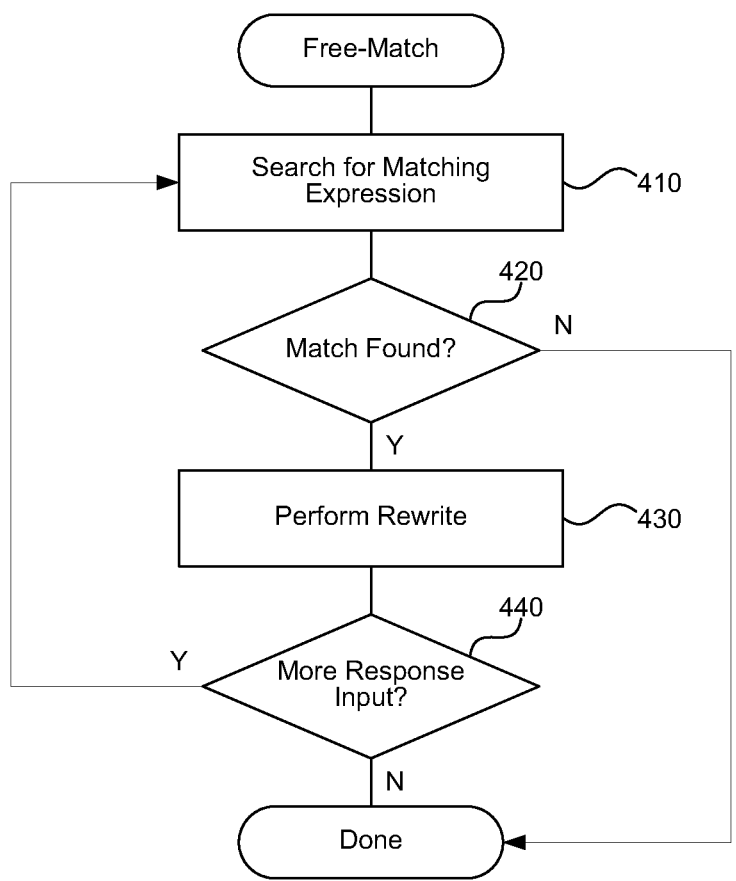
FIG. 4 is a flow diagram that illustrates the processing of the rule execution component with respect to a free-matching rule, in one embodiment.

FIG. 4 is a flow diagram that illustrates the processing of the rule execution component with respect to a free-matching rule, in one embodiment. Beginning in block 410, the component searches the response for expressions matching the free match rule. For example, the system may invoke a text searching component to search text of an HTML response for a regular expression or other pattern definition. Continuing in decision block 420, if the component finds the pattern, then the component continues at block 430, else the component completes.

Continuing in block 430, the component performs a rewrite by applying an action associated with the rule for which the pattern matched. For example, the action may specify text to add to the matching portion of the response. Continuing in decision block 440, if the response contains more input after the previously matched portion, then the component loops to block 410 to continue searching for matching expressions, else the component completes. After block 440, these steps conclude.

In some embodiments, the content rewriting system uses a different process for executing outbound rules than that used for inbound rules. An inbound rule set is evaluated only once per request because the set's input is a single request URL string. In contrast, an outbound rule set may be evaluated many times per response as the set is being applied in multiple places within HTTP response content. For example, consider a rule set with a first rule that applies to "<a>" tags and "<img>" tags and a second rule that applies only to the "<a>" tag. If an HTML response contains the markup, "<a href="/default.aspx"><img src="/logo.jpg"/>Home Page</a>," then the system will evaluate the first rule against the "/default.aspx" string. If the system executes the rule successfully, then the system provides the output of the first rule to the second rule. If the second rule executes successfully, then the second rule's output replaces the content of the "href" attribute in the "<a>" tag in the response. After that the system evaluates the first rule against the "/logo.jpg" string. If the rule executes successfully then the rule's output replaces the content of the "src" attribute in the "<img>" tag in the response.

In some embodiments, the order in which rules are defined affects how the content rewriting system handles and optimizes the rules' execution. Each rule can belong to a set of preconditions; the rewriting engine will execute the preconditions for each rule before starting the parsing of the HTML response content and will only execute the rules where the preconditions succeed. Preconditions are based on web server variables, HTML headers, custom data, and so forth. This is useful to execute rules only when they are needed (e.g., for HTML/TEXT content only or when specified server variables or headers are set).

In some embodiments, for contiguous rules with an HTML tag filter, the system merges the specified HTML tags and provides a merged view to an HTML parser. The parser looks for the specified HTML tag's attributes and every time the parser finds an attribute, the parser calls back the rewriting engine and starts execution of all the contiguous rules with that HTML tag filter. In this way, the HTML response content is parsed once per group of contiguous rules with that tag filter. This also enables the capability of using multiple rules for rewriting a single HTML tag's attribute. For free-matching rules, the content rewriting system parses the entire HTML response content. To increase efficiency, the system may provide a switch to enable doing all rewriting before the web server output cache is updated, to allow performing rewriting just once. As an example, given the following rules:

Rule 1 - Filter by A, Img, Match pattern "(.+)", Rewrite to "/base1/{R:1}"
Rule 2 - Filter by Img, Match pattern "(.+)", Rewrite to "/base2/{R:1}"

Rule 3 - No filter, Match pattern "<script>(.+)</script>", Rewrite to "<script language="JScript">{R:1}</script>"

The content rewriting system will parse the HTML response content twice. The first pass will parse HTML content looking for "A" and "Img" tags. If the system finds an HTML tag "A," the system will execute Rule 1. If the system finds an HTML tag "Img," the system will execute both Rule 1 and Rule 2, where the output of Rule 1 is the input for Rule 2. The second pass will match the pattern in Rule 3 and rewrite the content so the script HTML tag contains the language attribute.

In some embodiments, the content rewriting system allows rules to inherit. If rules are defined on multiple configuration levels, then the system evaluates the rule set that includes distributed rules from parent configuration levels as well as rules from a current configuration level. The evaluation is performed in a parent-to-child order, which means that parent rules are evaluated first and the rules defined on a last child level are evaluated last.

In some embodiments, the system provides an HTML encoding function for rules to sanitize rewritten text. Outbound rewriting may often use un-trusted data (e.g., query string or HTTP headers) to build a replacement string to insert into the HTTP response. In these cases, the HTML encoding function can be used to prevent insertion of client-side scripts into the response, which could result in cross-site scripting or other vulnerabilities.

In some embodiments, the content rewriting system provides logging of rule execution. Logging of what values were replaced with other values may be useful for debugging rules or for auditing the behavior of the system.

In some embodiments, the content rewriting system stores rules in a configuration XML file. Following is an example of a configuration with one rule with a tag-based filter and one rule without a filter and including a precondition:

```
<?xml version="1.0" encoding="UTF-8"?>
<configuration>
    <system.webServer>
        <rewrite>
            <outboundRules>
                <rule name="Rewrite Links" enabled="true"
                patternSyntax="Wildcard" preCondition="HTML Only">
                    <match filterByTags="A, Img" pattern="/*"
                    ignoreCase="false" />
                    <action type="Rewrite" value="http://serv/{R:1}" />
                </rule>
                <rule name="Full match" enabled="true"
                patternSyntax="ECMAScript" preCondition="HTML Only">
                    <match filterByTags="None"
                    pattern="http://support \.contoso\.com"
                    ignoreCase="false" />
                    <action type="Rewrite"
                    value="http://www.contoso.com/support" />
                </rule>
                <preConditions>
                    <preCondition name="HTML Only"
                    patternSyntax="Wildcard">
                        <add input="{RESPONSE_CONTENT_TYPE}"
                        pattern="text/html*" />
                    </preCondition>
                </preConditions>
            </outboundRules>
        </rewrite>
    </system.webServer>
</configuration>
```

The following describes one possible format for an XML configuration file for specifying rules. Those of ordinary skill in the art will recognize many other methods of storing similar rule information.

Preconditions are used to check whether a rule will be evaluated against response content. A preconditions collection is defined as a named collection within a <preConditions> section of the XML file and may contain one or more precondition checks. The outbound rule references the preconditions collection by name, as shown in the example above. A preconditions collection may have an attribute called logicalGrouping that controls how conditions are evaluated. A preconditions collection evaluates to true if all preconditions within the collection evaluate to true when logicalGrouping="MatchAll" is specified and if at least one of the preconditions evaluates to true when logicalGrouping="MatchAny" is specified.

A precondition is defined by specifying an input string and a pattern. Precondition input specifies which item to use as an input for the condition evaluation. Precondition input is an arbitrary string that can include server variables and back-references to prior precondition patterns. Precondition patterns can be specified by using either regular expression syntax or by using wildcard syntax. The type of pattern to use in a precondition depends on the value of a patternSyntax flag defined for the precondition collection. In addition, the result of the precondition evaluation can be negated by using a negate attribute.

An example of a precondition that checks if the response content type is text/html follows:

```
<preConditions>
    <preCondition name="IsHTML">
        <add input="{RESPONSE_CONTENT_TYPE}"
            pattern="^text/html" />
    </preCondition>
</preConditions>
```

Tag filters are used to narrow down the search within the response content to a set of well known or custom defined HTML tags. When a rewrite rule uses tag filters then, instead of matching the rule pattern against the entire response, the system searches the response for HTML tags that are listed in the rule's tag filter and then takes the content of the URL attribute of that tag and evaluates it against the rule's pattern. Tag filters are specified within the filterByTags attribute of the <match> element of an outbound rule. For example, "<match filterByTags="A" pattern="^/(article/aspx.*)"/>." If an HTTP response contains an anchor tag such as, "<a href="/article.aspx?id=1">link</a>," then the rewrite rule pattern will be evaluated against the string, "/article.aspx?id=1."

In some embodiments, the system includes predefined tags that a user can specify as a tag filter. The system may apply rules to predetermined attributes of the predefined tags, such as the "href" attribute of "a," "area," "base," and "link" tags, the "src" attribute of "script" tags, and so forth. If rewriting needs to be performed within an attribute of a tag that is not included in the pre-defined tags collection, then a custom tag collection can be used to specify the tag name and the corresponding attribute to be rewritten. A custom tags collection is defined as a named collection within the <customTags> section. Outbound rule references a custom tags collection by name. The following example shows a definition of a custom tags collection:

```
<customTags>
    <tags name="My Tags">
        <tag name="item" attribute="src" />
        <tag name="element" attribute="src" />
    </tags>
</customTags>
```

This custom tags collection can be referenced from an outbound rule as shown in the example below:

```
<match filterByTags="A, CustomTags" customTags="My Tags"
    pattern="^/(article\.aspx.*)" />
```

A rule pattern is used to specify what the rule input string will be matched to. Rule input differs based on the rule configuration. If a rule uses tag filters then the content of the matched tag attributed will be passed as an input for the pattern matching. If the rule does not use any tag filters then the entire response content will be passed as an input for the pattern matching. The pattern is specified within a <match> element of a rewrite rule. Rule pattern syntax can be specified by using the patternSyntax attribute of a rule. This attribute can be set to perform matching based on the Perl-compatible ECMAScript standard, wildcards, exact matching, and so forth. The scope of the patternSyntax attribute is per rule, meaning that it applies to the current rule's pattern and to all patterns used within conditions of that rule. Patterns can be negated by using a negate attribute of the <match> element. When this attribute is used then the rule action will be performed only if the input string does not match the specified pattern.

Rule conditions allow defining additional logic for rule evaluation, which can be based on inputs other than just a current input string. Any rule can have zero or more conditions. Rule conditions are evaluated after the rule pattern match is successful. Conditions are defined within a <conditions> collection of a rewrite rule. This collection has an attribute called logicalGrouping that controls how conditions are evaluated. If a rule has conditions, then the rule action will be performed only if rule pattern is matched and all conditions were evaluated to true if logicalGrouping="MatchAll" is specified or at least one of the conditions was evaluated to true if logicalGrouping="MatchAny" is specified. A condition is defined by specifying an input string and a pattern. Condition input specifies which item to use as an input for the condition evaluation. Condition input is an arbitrary string that can include server variables and back-references to prior condition patterns and/or to rule patterns. The condition pattern is a pattern to look for in the condition input. A pattern can be specified by using either regular expression syntax or by using wildcard syntax. The type of pattern to use in a condition depends on the value of the patternSyntax flag defined for the rule to which this condition belongs.

A rewrite rule action is performed when the input string matches the rule pattern and the condition evaluation has succeeded (depending on rule configuration, either all conditions matched or any one or more of the conditions matched). There are two types of actions available and the "type" attribute of the <action> configuration element can be used to specify which action the rule has to perform. The following describes different action types and the configuration options related to specific action types. A rewrite action replaces the current rule input string with a substitution string. The substitution string is specified within the value attribute of the <action> element of the rule. The substitution string is a free form string that can include back-references to the condition and rule patterns as well as server variables. A none action is used to specify that no action should be performed.

From the foregoing, it will be appreciated that specific embodiments of the content rewriting system have been described herein for purposes of illustration, but that various modifications may be made without deviating from the spirit and scope of the invention. Accordingly, the invention is not limited except as by the appended claims.

We claim:

1. A computer system for rewriting initial web content query responses from a web server, the system comprising:
    a processor and memory configured to execute software instructions;
    a web content query response receiving component configured to receive an initial web content query response to a web content query, the initial web content query response comprising a web page comprising a plurality of links and a content;
    a rule definition component configured to allow an administrator to define one or more rewriting rules for rewriting the received initial web content query response;
    a rule data store configured to store defined rewriting rules to be accessed in response to received web content query responses;
    a rule indexing component configured to identify defined rewriting rules of the rule data store and determine a union of matching filters defined within the rewriting rules;
    a web content query response parsing component configured to parse the received initial web content query response and invoke a rule execution component for one or more patterns within the initial web content query response that match one or more matching filters of the defined rewriting rules to produce a rewritten web content query response, wherein the web content query response parsing component is further configured to, upon encountering a pattern of an HTML tag within the initial web content query response, retrieve a rule list from the rule indexing component to determine if the HTML tag within the initial web content query response matches one or more rewriting rules, wherein the response parsing component is further configured to store a first modified output web content query response modified by a first rewriting rule to supply as input to a next rewriting rule in an iterated sequence of rewriting rules;
    a rule execution component configured to execute one or more rewriting rules on a portion of the web content query response provided by the web content query response parsing component; and
    a web content query response sending component configured to pass the rewritten web content query response back to a sender from which the initial web content query response was received.

2. The system of claim 1 wherein the web content query response receiving component is further configured to receive the initial web content query response from a web application after receiving an Hypertext Transfer Protocol (HTTP) request from a client.

3. The system of claim 1 wherein the web content query response receiving component is further configured to receive query response Hypertext Transfer Protocol (HTTP) headers and server variables associated with the web content query response.

4. The system of claim 1 wherein the web content query response parsing component is further configured to perform multiple parsing passes, including a first pass to apply tag-based rewriting rules and a second pass to apply free-matching rewriting rules.

5. A computer-implemented method for rewriting outbound responses, comprising:
    receiving an initial web content query response to a web content query, the initial web content query response comprising a web page comprising a plurality of links and a content;
    allowing an administrator to define one or more rewriting rules for rewriting the received initial web content query response;
    storing defined rewriting rules in a rule data store to be accessed in response to received web content query responses;
    identifying defined rewriting rules of the rule data store and determining a union of matching filters defined within the rewriting rules;
    parsing the received initial web content query response and invoking a rule execution component for one or more patterns within the initial web content query response that match one or more matching filters of the defined rewriting rules to produce a rewritten web content query response, wherein upon encountering a pattern of an HTML tag within the initial web content query response, retrieving a rule list to determine if the HTML tag within the initial web content query response matches one or more rewriting rules, and storing a first modified output web content query response modified by a first rewriting rule to supply as input to a next rewriting rule in an iterated sequence of rewriting rules;
    executing one or more rewriting rules on a portion of the web content query response; and
    passing the rewritten web content query response back to a sender from which the initial web content query response was received.

6. The method of claim 5, further wherein the initial response is received from a web application after receiving an Hypertext Transfer Protocol (HTTP) request from a client.

7. The method of claim 5, further comprising receiving response Hypertext Transfer Protocol (HTTP) headers and server variables associated with the response.

8. The method of claim 5, further comprising performing multiple parsing passes, including a first pass to apply tag-based rewriting rules and a second pass to apply free-matching rewriting rules.

9. A computer-readable storage medium comprising instructions for rewriting outbound responses, wherein the instructions, when executed, cause a processor to perform actions comprising:
    receiving an initial web content query response to a web content query, the initial web content query response comprising a web page comprising a plurality of links and a content;
    allowing an administrator to define one or more rewriting rules for rewriting the received initial web content query response;
    storing defined rewriting rules in a rule data store to be accessed in response to received web content query responses;
    identifying defined rewriting rules of the rule data store and determining a union of matching filters defined within the rewriting rules;
    parsing the received initial web content query response and invoking a rule execution component for one or more patterns within the initial web content query response that match one or more matching filters of the defined rewriting rules to produce a rewritten web content query response, wherein upon encountering a pattern of an HTML tag within the initial web content query response, retrieving a rule list to determine if the HTML tag within the initial web content query response matches one or more rewriting rules, and storing a first modified output web content query response modified by a first rewriting rule to supply as input to a next rewriting rule in an iterated sequence of rewriting rules;

executing one or more rewriting rules on a portion of the web content query response; and passing the rewritten web content query response back to a sender from which the initial web content query response was received.

10. The computer-readable storage medium of claim 9, further wherein the initial response is received from a web application after receiving an Hypertext Transfer Protocol (HTTP) request from a client.

11. The computer-readable storage medium of claim 9, further comprising receiving response Hypertext Transfer Protocol (HTTP) headers and server variables associated with the response.

12. The computer-readable storage medium of claim 9, further comprising performing multiple parsing passes, including a first pass to apply tag-based rewriting rules and a second pass to apply free-matching rewriting rules.

* * * * *